No. 791,462.                                            Patented June 6, 1905.

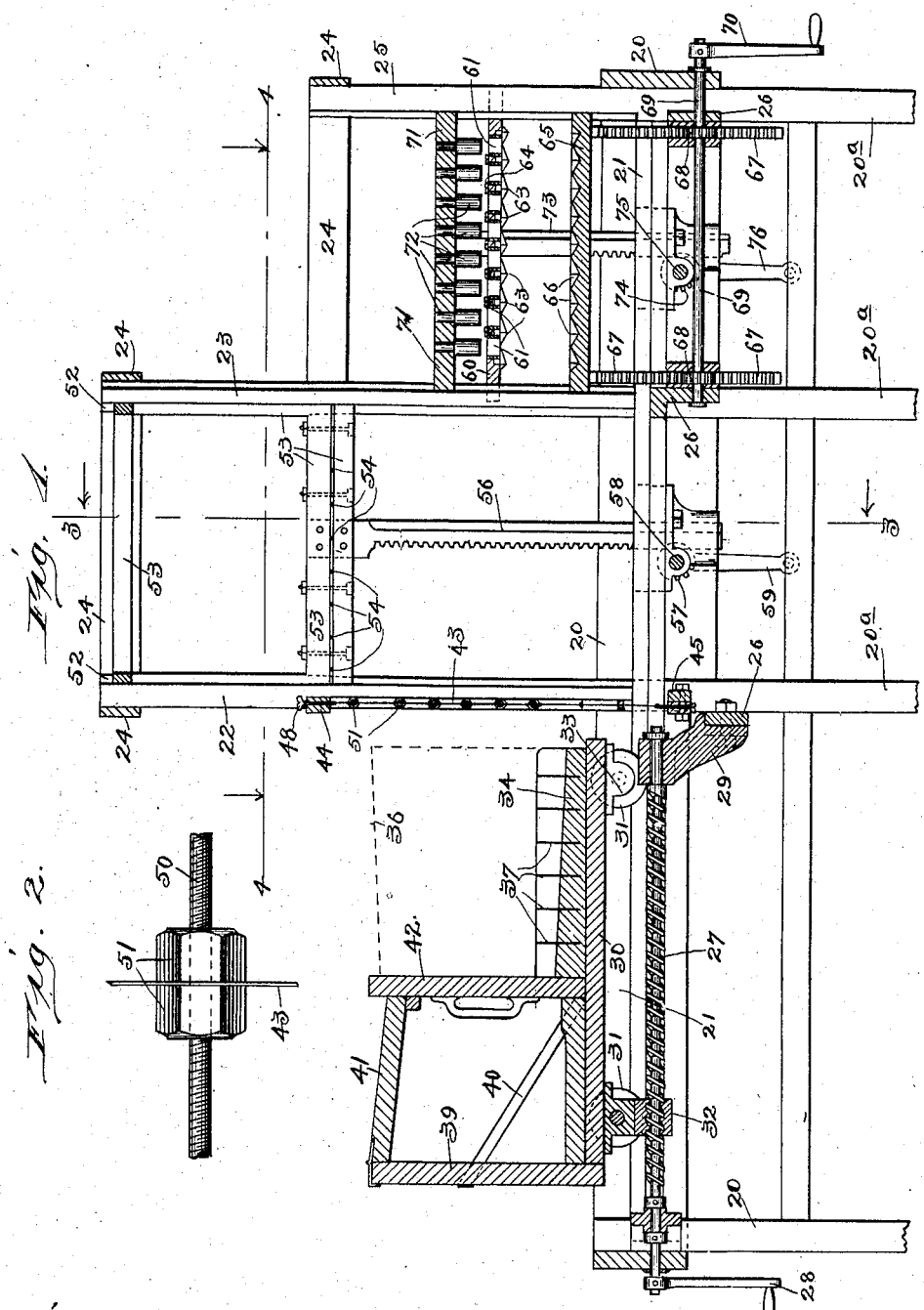

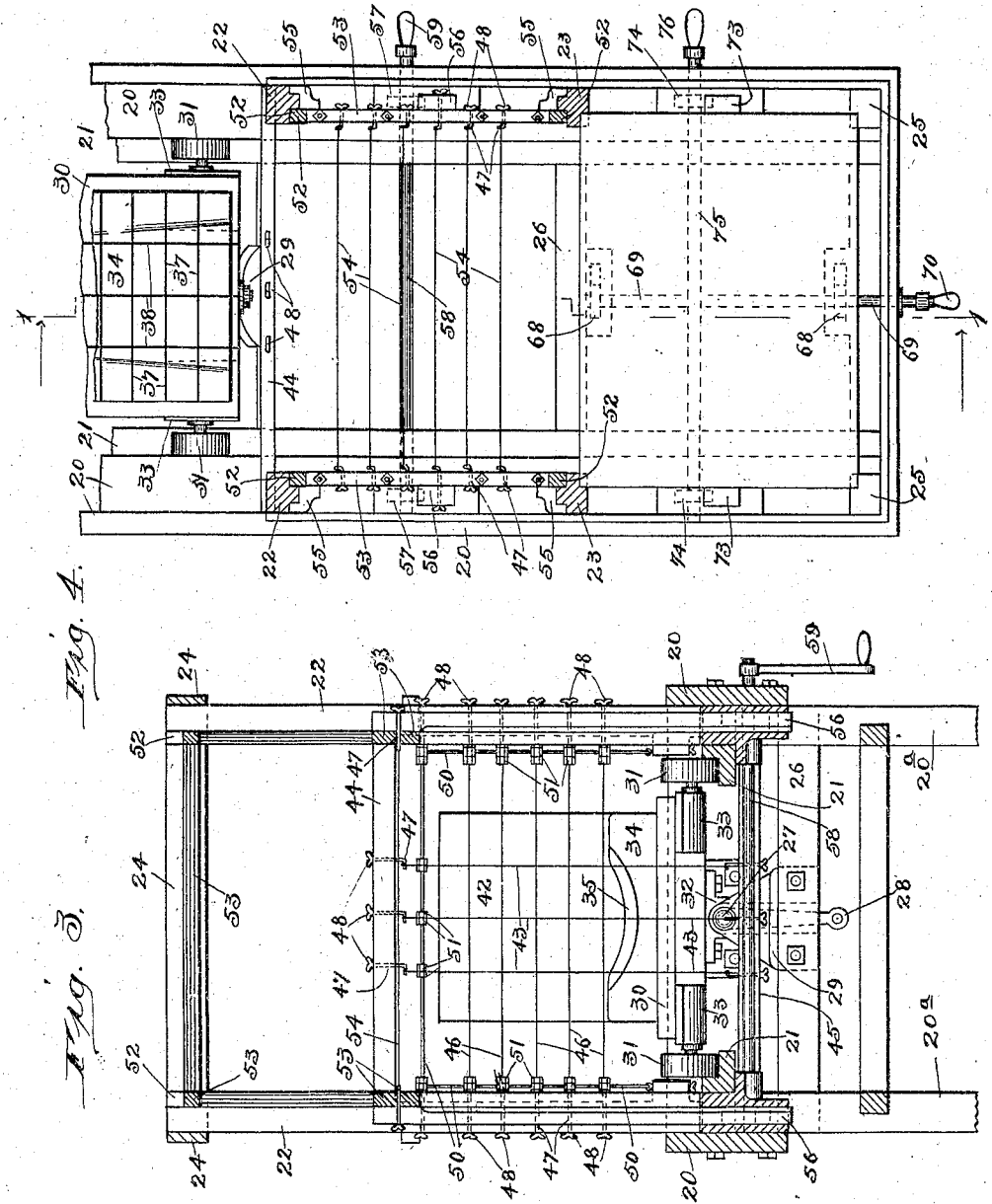

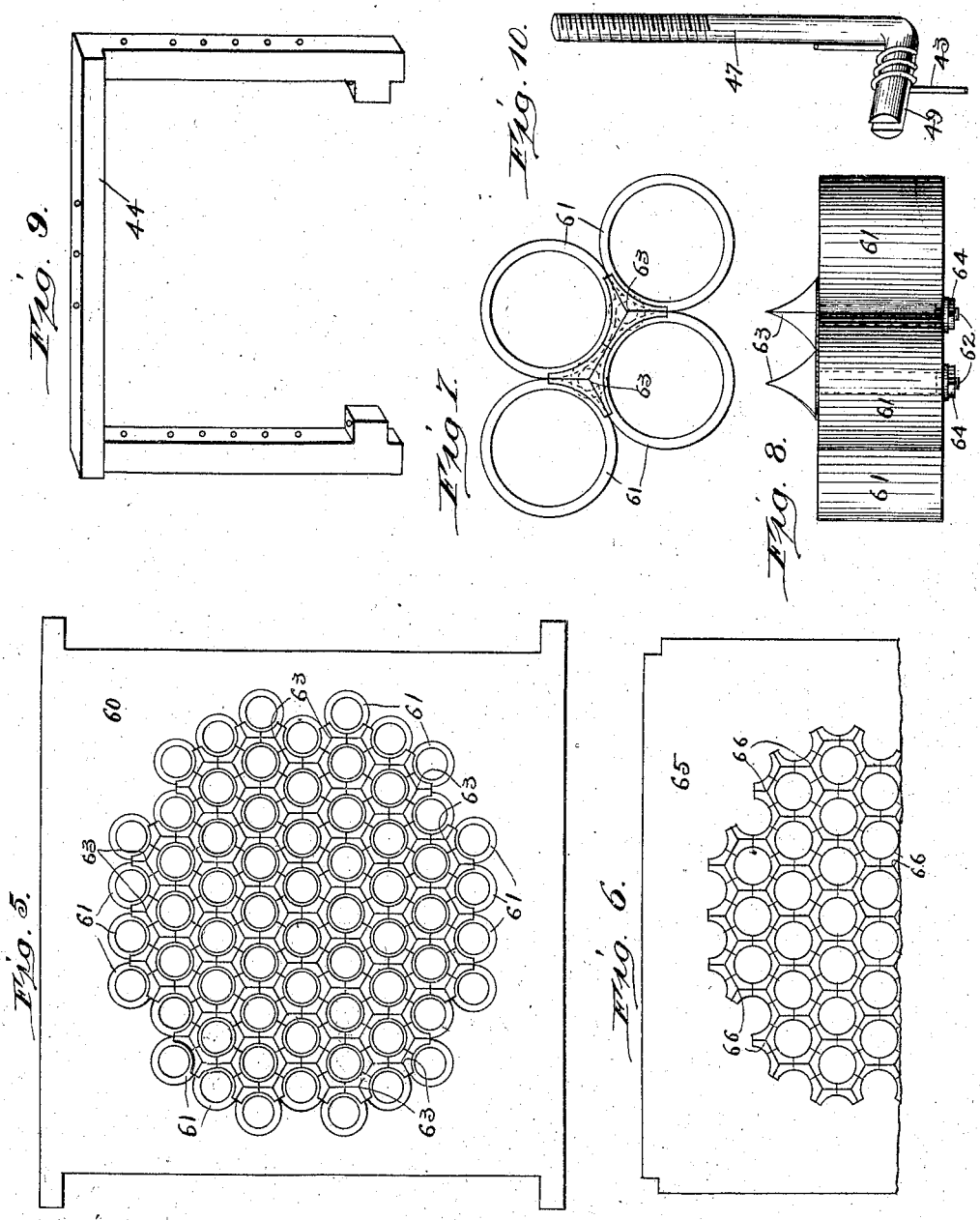

UNITED STATES PATENT OFFICE.

PIERCE F. GIBBONS, OF NEW YORK, N. Y.

BUTTER-CUTTER.

SPECIFICATION forming part of Letters Patent No. 791,462, dated June 6, 1905.

Application filed November 5, 1904. Serial No. 231,547.

*To all whom it may concern:*

Be it known that I, PIERCE F. GIBBONS, a citizen of the United States, residing at New York city, in the county of New York and State of New York, have invented certain new and useful Improvements in Butter-Cutters, of which the following is a specification.

This invention relates to certain new and useful improvements in a butter-cutter; and it consists in certain peculiarities of the construction, novel arrangement, and operation of the various parts thereof, as will be hereinafter more fully set forth, and specifically claimed.

The principal object of the invention is to combine in one machine of simple and inexpensive construction means for cutting a bulk of butter, such as a tub or firkin, into bricks or prints of the desired size or for cutting it into slabs and then form it into smaller pieces or patties for individual use at the table.

Another important object of the invention is to so construct that part of the machine which forms the butter into small cakes or individual pieces that there shall be no waste or fragments left between the molds or forming-tubes.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a central longitudinal sectional view of a butter-cutter embodying my invention, taken on line 1 1 of Fig. 4 looking in the direction indicated by the arrows and showing the parts in position ready for operation. Fig. 2 is an enlarged view, in side elevation, of a portion of one of the strengthening-rods for the cutting-wires, showing nuts thereon to clamp said wires. Fig. 3 is a transverse sectional view taken on line 3 3 of Fig. 1 looking in the direction indicated by the arrows. Fig. 4 is a top plan view of a portion of the machine, taken on line 4 4 of Fig. 1 looking in the direction indicated by the arrows. Fig. 5 is a bottom plan view of the mold-holding shelf. Fig. 6 is a top plan view of a portion of the feeding-table. Fig. 7 is an enlarged end view of some of the molds. Fig. 8 is a side view thereof. Fig. 9 is a detached perspective view of the vertical or transverse cutting-frame, and Fig. 10 is a similar view of one of the securing-hooks for the cutting-wires.

Like numerals of reference refer to corresponding parts throughout the different views of the drawings.

The reference-numeral 20 indicates the main or supporting frame, which may be made of any suitable size, form, and material, but preferably rectangular in shape and of wood.

Secured horizontally on the inner surface of each of the sides of the frame 20 is a track-rail 21, which extends from one end of the frame to the other and which are for the purpose of supporting and guiding the wheels of the wheeled table, which carries the bulk of butter, as will be presently explained.

Located vertically at about the middle of the frame 20 and extending thereabove to a suitable distance are two uprights or standards 22, one of which is located on one side of the frame and the other on the other side thereof.

Located vertically on each side of the frame 20 and at a suitable distance toward the front end thereof from the posts or standards 22 and extending above the frame is a standard or upright 23, which are connected together, as well as to the standards 22, by means of brace-bars 24, which will firmly unite them at their upper ends.

Located vertically on each side of the frame 20 at its front end is a standard or upright 25, which extend upwardly from the frame and are connected together, as well as to the standards 23, by means of brace-bars 24. These standards 22, 23, and 25 may and preferably do extend through the sides of the frame to form supporting-legs 20$^a$ therefor, which may be connected together by means of cross-pieces 26, located below the upper portion of the main frame.

Journaled longitudinally and horizontally on the rear portion of the main frame and about midway between its sides is a worm-shaft 27, which has on one of its ends a crank-handle 28 to operate the same. The front end of the shaft 27 is journaled in a bracket 29, secured to one of the cross-pieces 26 and extending upwardly therefrom.

Mounted on the rear portion of the main frame is a wheeled table 30, the wheels 31 of which rest and travel on the track-rails 21, as will be readily understood by reference to Figs. 1, 3, and 4 of the drawings. This table carries on its lower surface near its rear end a worm-threaded bracket 32, which engages the worm-shaft 27, so as to propel the table 30 when said shaft is turned. The front wheels 31 of this table are mounted on stub-shafts 33, secured to the lower surface of the table, but which extend only a part of the way across the same, thus leaving space for the passage of the vertical wires of the brick or print cutting frame. The upper front portion of the table 30 has mounted thereon a block 34, having a concaved and tapered seat 35 for the tub or firkin 36 of butter. This block is provided with transverse slots 37 and longitudinal slots 38 for the purpose to be presently explained.

Extending upwardly from the rear end of the table 30 is a back 39, which is secured to the sides of the table by means of braces 40, as is clearly shown in Fig. 1 of the drawings. Hinged at one of its ends to the upper portion of the back 39 is a bar 41, the other end of which is adapted to impinge the rear upper portion of a removable back 42, which is used to press against the rear end of the tub of butter 36, as well as the rear end of the block 34, which is movably mounted on the wheeled table.

The front portion of the table 30 is provided with vertical slots between the adjacent ends of the stub-shafts 33, which slots register with the vertical slots 38 in the block 34 and are for the reception and operation of the vertical cutting-wires 43 in the frame 44, which is removably secured to the rear surfaces of the posts 22, as is clearly shown in Figs. 1 and 3 of the drawings, and which frame, with its cutting-wires, cut the tub of butter into longitudinal strips.

Extending crosswise of the main frame just below the rails 21 is a bar 45, to which the lower ends of the vertical wires 43 are secured.

As shown in Fig. 3 of the drawings, the horizontal or transverse wires 46 of the frame 44 are secured in the sides of said frame by means of hooked rods 47, which have their outer ends screw-threaded, and each carries a winged nut 48, by means of which the wires are tightened. The hooked or inner end of each of the rods 47 is provided with a slot 49 to receive the wires, which are wrapped around said hooked portion, as shown in Fig. 10 of the drawings. The ends of the vertical wires are secured in the frame 44 and to the cross-bar 45 by means of said hooks. In order to brace and strengthen the transverse as well as vertical wires, I secure on the inner surface of the sides of the frame and near the top rail thereof screw-threaded rods 50, on each of which is mounted in pairs a series of nuts 51, which clamp the wires, as is clearly shown in Figs. 2 and 3 of the drawings, and prevent their lateral movement.

As shown in Fig. 4 of the drawings, the inner surfaces of the posts 22 and 23 are formed with recesses 52 to receive the ends of the horizontal frame 53, which carries transverse wires 54 to cut the longitudinal strips of butter formed by the frame 44 and its wires, when the same is used, into blocks or bricks, but when the same is not used to cut the tub of butter into slabs. Each end of the side pieces of the frame 53 is provided with an overlapping bracket 55, which act as guides for said frame. Secured at its upper end to each of the lower side pieces of the frame 53 is a rack-bar 56, which passes through the sides of the main frame and which rack-bar engages pinion 57, mounted on a shaft 58, transversely journaled on the main frame, and which may be turned by means of a crank-handle 59 on one of the ends thereof.

Rigidly and horizontally mounted between the posts 23 and 25 is a mold-carrying shelf 60, which is provided with a series of molds 61, which in the present instance are shown as being tubular in form. Between the molds or tubes 61 are located rods 62, which have on their lower ends pointed projections 63, triangular in shape. These rods are located in the openings between the tubes or molds 61, and the pointed heads will overlap a portion of each end of each of said tubes, as shown, Fig. 7 of the drawings. The tubes, as well as the pointed rods, may be held together by means of solder, or nuts 64 on the opposite ends from the points may be employed to hold them in place.

Movably and horizontally located between the posts 23 and 25 below the shelf 60 is a feeding-table 65, which has in its upper surface a series of indentations 66, corresponding in shape and number with the projections 63, for the reception of which they are intended. This table is moved vertically by means of a rack-bar 67, located at each of its ends, which rack-bars engage pinions 68 on a shaft 69, longitudinally journaled on the main frame, and which shaft has a crank-handle 70 at its outer end for turning the same.

Movably and horizontally mounted between the posts 23 and 25 above the shelf 60 is a plunger-frame 71, which carries on its lower surface a series of plungers 72, which are adapted to fit in the tubes 61 of the mold-shelf. The plunger-frame 71 is moved vertically by means of a rack-bar 73, located at each of its sides, which rack-bars mesh with pinions 74 on a shaft 75, transversely journaled on the main frame and which has on one of its ends a crank-handle 76, used for turning the same.

From the foregoing and by reference to the drawings it will be clearly seen and readily understood that by placing the bulk of butter 36 on the block 34 of the traveling table 30 the said table may be advanced by turning the worm-rod 27 in the proper direction, in which operation the wires of the frame 44 will cut the butter into longitudinal strips. When thus severed, the frame 53, carrying the transverse wires 54, may be lowered by turning the shaft 58 in the proper direction, in which operation the longitudinal strips of butter will be severed transversely, thus forming bricks or prints. When it is desired to form the butter into small or individual pieces, the frame 44 may be removed, when by advancing the traveling table 30, as before, and lowering the frame 53 it is apparent that the butter will be cut, by means of the transverse wires 54, into slabs, one of which may be placed on the feeding-table 60, which may be raised by turning the shaft 69 in the proper direction, in which operation the butter will be forced up into the tubes or molds 61, the points 63 and the correspondingly-shaped depressions 66 in the feeding-table forcing all of the butter into the tubes or molds and preventing waste or fragments being left between the tubes. While the feeding-table is in its raised position the plunger-frame 72 may be lowered by turning the shaft 75 in the proper direction, which operation will cause the plungers to enter the tubes 61 and to compress the butter therein into firm and solid cakes. By lowering the feeding-table and by moving the plunger-frame farther downwardly it is apparent that the cakes or individual pieces thus formed will be pushed from the molds onto the feeding-table, from which they may be removed. When desired, the free ends of the plungers 72 may be provided with ornamental designs for imprinting the same on the small cakes.

It is obvious from the above description that the device is susceptible of considerable modification without material departure from the principles and spirit of the invention, and for this reason I do not wish to be understood as limiting myself to the precise form and arrangement of the several parts of the device as herein shown in carrying out my invention in practice.

Having thus fully described my invention, what I claim as new, and desire to secure by Letters Patent, is—

1. In a butter-cutter, the combination with the main frame, of a table movable longitudinally thereon and having in its front portion longitudinally-extending vertical slots, a transversely and longitudinally slotted block mounted on the upper surface of said table and having in its upper surface a concave and tapered recess, a transverse frame vertically mounted in front of said table and provided with transverse and vertical cutting-wires, a horizontal frame provided with transverse cutting-wires mounted so as to be moved vertically near the transverse frame, means to advance and retract the table, and means to raise and lower the horizontal frame, substantially as described.

2. In a butter-cutter, the combination with the main frame, of a table movable longitudinally thereon, a transversely-slotted block mounted on the table and having in its upper surface a concave and tapered recess, a horizontal frame provided with transverse cutting-wires mounted so as to be moved vertically, means to advance and retract the table, and means to raise and lower said frame, substantially as described.

3. In a butter-cutter, the combination with the main frame, of a table movable longitudinally thereon, a horizontal frame provided with transverse cutting-wires mounted so as to be moved vertically, means to advance and retract the table, means to raise and lower said frame, a mold-holding shelf rigidly and horizontally mounted near said frame, a feeding-table movable vertically below said shelf, a plunger-carrying frame movable vertically above said shelf, means to raise and lower the feeding-table, and means to raise and lower the plunger-frame, substantially as described.

4. In a butter-cutter, the combination with the main frame, of a table movable longitudinally thereon, a horizontal frame provided with transverse cutting-wires mounted so as to be moved vertically, means to advance and retract the table, means to raise and lower said frame, a shelf rigidly and horizontally mounted near said frame, a series of molds vertically located in said shelf, a series of pointed projections on the lower surface of the shelf between the ends of the molds, a feeding-table movable vertically below said shelf, and having a series of indentations to receive said projections, a plunger-carrying frame movable vertically above said shelf, means to raise and lower the feeding-table and plunger-frame independently of each other, substantially as described.

5. In a butter-cutter, the combination with the main frame, of a table movable longitudinally thereon, a transverse frame vertically mounted in front of said table, a screw-threaded rod located on the inner surfaces of the side and end rails of said frame, a series of nuts arranged in pairs on each of said rods, transverse and vertical cutting-wires secured at their ends to the rails of the frame, each of said wires being clamped near its end by means of a pair of said nuts, a horizontal frame provided with transverse cutting-wires mounted so as to be moved vertically near the transverse frame, means to advance and retract the table, and means to raise and lower the horizontal frame, substantially as described.

6. In a butter-cutter, the combination with the main frame, of a cutting-wire-carrying frame mounted thereon, a screw-threaded rod located on the inner surface of the side and end rails of said wire-carrying frame, a series of nuts mounted on each of said rods and arranged in pairs, a series of rods transversely secured on each of the rails of the wire-carrying frame and having on their inner ends a slotted hook portion, and a series of cutting-wires secured near their ends in the slots of said hooks and each of said wires being clamped by a pair of said nuts, substantially as described.

PIERCE F. GIBBONS.

Witnesses:
   A. H. GRAHAM,
   W. ROSS THOWSON.